United States Patent
Isaacson (10) Patent No.: US 8,217,957 B1
(45) Date of Patent: Jul. 10, 2012

(54) SYSTEM AND METHOD FOR DIGITAL IMAGE STORAGE AND REPRESENTATION

(75) Inventor: Paul L. Isaacson, Sandy, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 896 days.

(21) Appl. No.: 12/150,924

(22) Filed: May 1, 2008

(51) Int. Cl.
*G06T 15/00* (2011.01)
*G06T 15/10* (2011.01)
*G06T 15/20* (2011.01)
*G06T 15/50* (2011.01)
*G06T 15/60* (2006.01)
*G06T 17/00* (2006.01)
*G09G 5/00* (2006.01)
*G06K 9/32* (2006.01)
*G06K 9/46* (2006.01)

(52) U.S. Cl. ........ 345/587; 345/419; 345/426; 345/427; 345/428; 345/582; 382/240; 382/299

(58) Field of Classification Search .................. 345/419, 345/426–428, 581, 582, 587; 382/240, 299
See application file for complete search history.

(56) References Cited

U.S. PATENT DOCUMENTS

| | | | |
|---|---|---|---|
| 6,373,482 B1 * | 4/2002 | Migdel et al. .................. | 345/419 |
| 6,593,925 B1 * | 7/2003 | Hakura et al. ................. | 345/426 |
| 7,609,276 B2 * | 10/2009 | Imai et al. ...................... | 345/589 |
| 2007/0211070 A1 * | 9/2007 | Stenson ......................... | 345/587 |
| 2008/0303841 A1 * | 12/2008 | Newhall, Jr. .................. | 345/587 |
| 2009/0002387 A1 * | 1/2009 | Woo et al. ..................... | 345/582 |

* cited by examiner

*Primary Examiner* — James A Thompson
*Assistant Examiner* — Jed-Justin Imperial
(74) *Attorney, Agent, or Firm* — Donna P. Suchy; Daniel M. Barbieri (57) ABSTRACT

A system generates continuous texture environment based on mipmapped texture and photographic images such that each mipmapped image has a plurality of mipmap level representations of a particular texture or photographic image. The system can include a delta value dataset configured to store a plurality of delta values for the texture images and photographic images. The system further includes an absolute value dataset configured to store a plurality of absolute values for the photographic images to be displayed in the continuous texture environment. The system yet further includes an environment processor configured to generate the continuous texture environment. The environment processor includes a blending processor configured to blend the photographic imagery and texture images to remove discontinuities using the delta values.

17 Claims, 5 Drawing Sheets

SYSTEM AND METHOD FOR DIGITAL IMAGE STORAGE AND REPRESENTATION

BACKGROUND

The present invention relates generally to the field of processing and displaying terrain texture maps using a digital imagery system. More particularly, the present invention relates to a system and method for providing digital image storage and representation through storing both absolute values and delta values to provide the images.

Virtual environment databases have traditionally included local areas of terrain, textured with either geo-specific photographic imagery or with geo-typical repeating imagery. In recent years however, continuous whole-earth terrain skinning algorithms have replaced the limited local-area terrain models. These algorithms have elevated the need for corresponding continuous whole-earth texturing mechanisms. While continuous whole-earth image datasets are available at 10-15 m resolution, they are costly, storage intensive, and too coarse for a wide variety of training tasks. Synthesizing higher-resolution imagery offers an attractive alternative, both in terms of cost and training utility. A technique for run-time synthesis of whole-earth high resolution terrain imagery, while minimizing unnatural repetition and other artifacts, may be used. This technique may also include run-time nested blending of multiple high resolution photographic insets.

Within the past couple of decades, technologies for producing continuous polygonal terrain meshes over arbitrarily large areas have become increasingly popular. In accordance with these algorithms, there has been a need to produce continuous terrain imagery over large areas as well. The demand for this is evident in many markets, including geographic information systems, visual simulation, entertainment, broadcast journalism, and web-based terrain browsing. Some image generator vendors added custom hardware support for large dynamic range texture mapping in their high-end systems (Cosman, M. A., 1994 and Tanner, C. C., Migdal, C. J., & Jones, M. T., 1998). For systems lacking custom hardware support, software-based mapping of terrain polygons to a correlated multi-resolution set of independent texture maps has achieved a similar result. Since large dynamic range texturing capabilities are now the norm for real-time systems, there exists a high demand for training-worthy high-resolution large area image content.

Satellite imagery currently provides continuous whole-earth coverage up to 15 meters in resolution. Although higher-resolution imagery is available for a large number of areas of interest throughout the world, the desire to achieve high-resolution coverage for the whole earth is not yet satisfied by commercial imagery. Furthermore, a complete coverage at one meter would require in excess of 500 trillion samples. Thus, it is necessary to consider a means of synthesizing high-resolution texture for the vast majority of the earth's surface. And it is desirable to seamlessly integrate high-resolution imagery into the synthetic backdrop.

The presentation of overlapping image data sets typically exhibits dissimilarities between neighboring data sets. An example of the dissimilarities occurs during juxtaposition of a high-resolution aerial photograph with a coarser-resolution satellite image. The discontinuity appears very unnatural and can result in negative training in a flight simulation environment. This discontinuity is generally minimized by blending, abutting, and/or nesting images. However, blending of images may result in loss of data integrity for the blended images, particularly where the images are stored as blended representations.

What is needed is a system and method for efficient run-time integration of high-resolution imagery into a synthetic background in a manner that minimizes discontinuities yet preserves data integrity. What is further needed is such a system and method configured to provide blended images and preserve the integrity of original images in a user-configurable system.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the invention relates to a system for generating and displaying a continuous texture environment based on mipmapped texture and photographic images such that each mipmapped image has a plurality of mipmap level representations of a particular texture or photographic image. The system includes a delta value dataset configured to store a plurality of delta values for the texture images and photographic images. Each delta value represents the difference between a child pixel in a first mipmap level and a parent sampling from a second mipmap level. The system further includes an absolute value dataset configured to store a plurality of absolute values for the photographic images to be displayed in the continuous texture environment. The system yet further includes an environment processor configured to generate the continuous texture environment including the texture images and the photographic images derived from the delta value dataset and the photographic images from the absolute value dataset. The environment processor includes a blending processor configured to blend the photographic imagery and texture images to remove discontinuities using the delta values.

Another embodiment of the invention relates to a system for generating and displaying a grid sampled dataset based on a mipmapped representation, each mip level having a plurality of representations. The system includes a delta value dataset configured to store a plurality of delta values for the dataset, each delta value representing the difference between a child sample in a first mipmap level and a parent sampling from a second mipmap level. The system further includes an absolute value dataset configured to store a plurality of absolute values for the dataset to be displayed in the grid sampled environment. The system yet further includes an environment processor configured to generate the grid sampled environment including the delta values and the absolute values. The environment processor includes a blending processor configured to blend the environment representation dataset to remove discontinuities using the delta values.

Yet another embodiment of the invention relates to a method for generating and displaying a continuous texture environment based on a user-selectable blending level. The method includes generating an absolute value dataset configured to store a plurality of absolute values for the dataset to be displayed in the grid sampled environment and generating a delta value dataset configured to store a plurality of delta values for the dataset. Each delta value represents the difference between a child pixel in a first mipmap level and a parent sampling from a second mipmap level. The method further includes generating the grid sampled environment including the delta values and the absolute values, including blending the environment representation dataset to remove discontinuities using the delta values.

Alternative examples and other exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Before describing in detail the particular improved system and method, it should be observed that the invention includes, but is not limited to, a novel structural combination of conventional data/signal processing components and communications hardware and software, and not in particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 1:
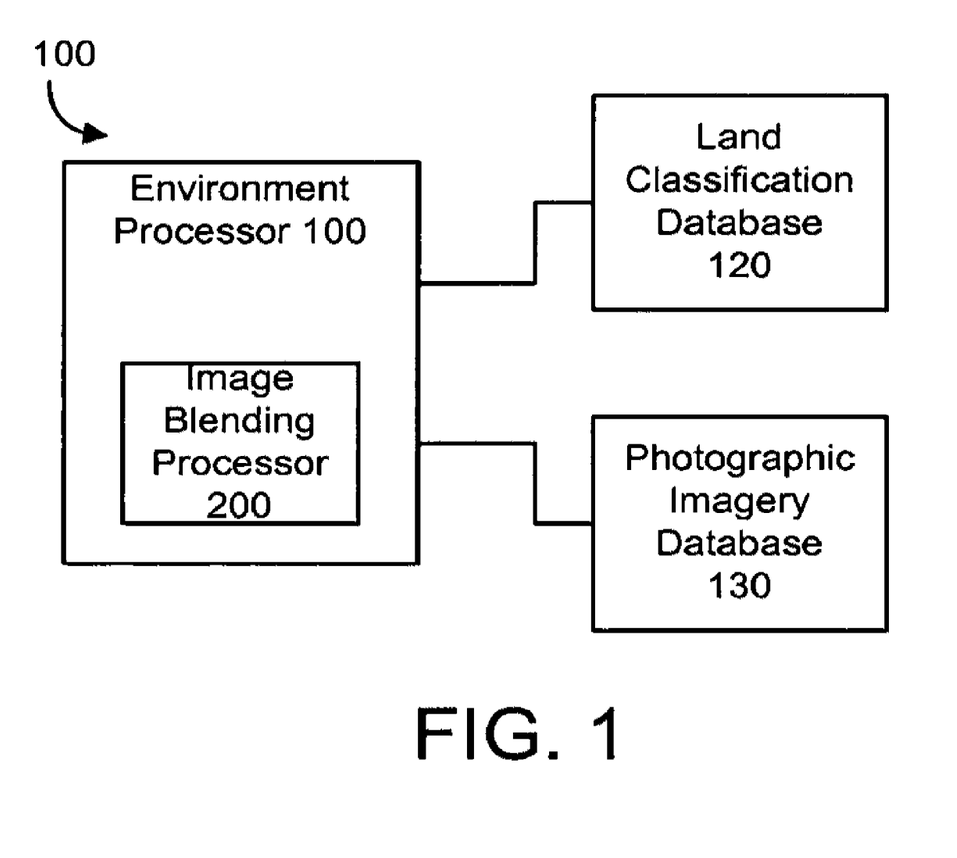
FIG. 1 is an environment processing system configured to implement a run-time synthesis of whole-earth, high resolution terrain imagery including run-time nested blending of insets, according to an exemplary embodiment.

Referring to FIG. 1, an environment processing system 100 configured to implement a run-time synthesis of whole-earth, high resolution terrain imagery including nested blending of high-resolution photographic insets is shown, according to an exemplary embodiment. System 100 includes an environment processor 110, a land classification database 120, and a photographic image database 130. Although shown according to a specific embodiment, system 100 may alternatively be configured to include more, fewer, and/or different components configured to implement functions described herein.

A continuous texture environment may be implemented using mipmapping. Mipmapping is a technique used to save some of the filtering work needed during texture minification, removing unnecessary pixels from an image to reduce its size. During texture magnification, the number of texels (pixels of the texture) that need to be looked up for any pixel is always four or less; during minification however, as the textured polygon moves farther away, potentially the entire texture might fall into a single pixel. Such minification would necessitate reading all of the image's texels and combining their values to correctly determine the pixel color, a prohibitively expensive operation. Mipmapping avoids this by pre-filtering the texture and storing it in smaller sizes down to a single pixel. As the textured surface moves farther away, the texture being applied switches to the pre-filtered smaller size. Different sizes of the mipmap are referred to as 'levels', with Level 0 being the largest size (used closest to the viewer), and increasing levels used at increasing distances.

In a mipmap set, each bitmap image of the set is a version of the main texture, but at a certain reduced level of detail. Although the main texture would still be used when the view is sufficient to render it in full detail, the renderer will switch to a suitable mipmap image (or in fact, interpolate between the two nearest, if trilinear filtering is activated) when the texture is viewed from a distance or at a small size. Rendering speed increases since the number of texels being processed can be much lower than with simple textures. Artifacts are reduced since the mipmap images are effectively already anti-aliased, taking some of the burden off the real-time renderer. Scaling down and up is made more efficient with mipmaps as well.

Each of the bitmap images may be associated with both an absolute-value sample and a delta-value sample. The absolute value is the value of a given pixel within the bitmap image. The delta value is determined by subtracting a sample from its next coarser sampling in the mipmap structure to produce a difference pyramid. Accordingly, image storage may be implemented by storing a combination of one or more mip levels of absolute samples and one or more mip levels of delta samples. Storing both absolute and delta samples allows the environment processor to efficiently produce blended, unblended, or partially blended insets.

Environment processor 110 may be a software application stored on computer readable medium and configured to implement a continuous texture environment. Environment processor 110 may be configurable such that the real-time continuous texture environment may be run on both low cost personal computer-based visual systems and high end image generator platforms. Environment processor 110 is a compositing engine configured to facilitate inserting texture images representing land coverage types and photographic images into a continuous whole earth texturing grid as indicated by a land coverage model. Environment processor 110 is configured to include an image blending processor 200 configured to integrate the synthetic images and photographic images in a manner to minimize discontinuity artifacts and unnatural countries to achieve natural and smooth presentation, further described below with reference to FIG. 2.

Land classification database 120 may be a database configured to store and provide synthetic images used by environment processor 110 in implementing the continuous texture environment. Terrain texture may be synthesized from land classification information and a library of geo-typical imagery. The land classification may be stored and provided as a spatially sampled grid of feature identification codes (FICs). The geo-typical images may also be referred to as texture "themes."

Photographic image database 130 may be a database configured to store and provide photographic images used by environment processor 110 in implementing the continuous texture environment. The photographic continuous texture layers originate from source imagery, provided and stored as one or more spatially-referenced files. Source files are re-sampled to user selectable rates and stored in spatially organized database 120.

According to an exemplary embodiment, environment processor 110 may be configured to implement the continuous texture using a combination of synthetic texture from database 120 and photographic imagery from database 130. The texture imagery and photographic imagery may be pieced together to form the continuous texture environment.

Figure 2:
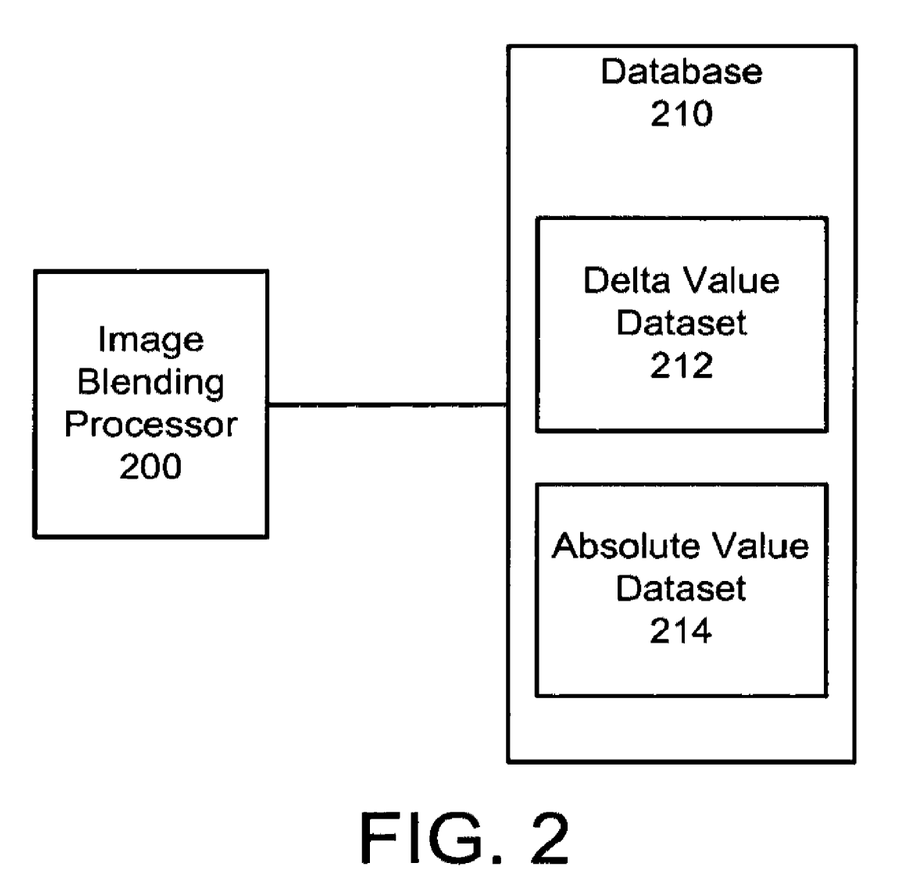
FIG. 2 is an image blending processor configured to implement the blending of synthetic and photographic imagery, according to an exemplary embodiment.

Referring to FIG. 2, an image blending processor 200 configured to implement the blending of the synthetic images and photographic images is shown, according to an exemplary embodiment. Blending textual images and photographic images involves extraction of successive spatial frequencies into a secondary pyramid of delta values. Each delta value is the difference from a child sample and a parent sample.

Processor 200 may be coupled to an imagery storage database 210 that includes a delta value dataset 212 and an absolute value dataset 214. Delta value dataset 212 may be a data set in database 210 coupled to processor 200 and configured to store the pyramids of delta values used to implement the above described blending function. Absolute value dataset 214 may be a data set in database 210 coupled to processor 200 and configured to store the original absolute values from which the delta values were generated. Although shown and described herein as a single database, database 210 may be implemented as multiple databases, a single database as shown, and/or any combination thereof.

As stated above, piecing together a collection of images may create a patchwork appearance to the displayed continuous texture environment. For example, a theme image will, in the general case, be discontinuous along its border when placed next to itself. Similarly, a high resolution photographic image will be discontinuous when nested within a lower resolution image. In order to make such a mosaic presentable, processor 200 may be configured to address discontinuity, rectilinearity, and repetition. The repetition may be addressed by supporting multiple variations within a given theme. The variations can either be preprocessed to self repeat, or can have run-time blending applied to smooth the discontinuous transition between a theme instance and its neighboring variations. The blending can be performed efficiently by storing the theme images as hybrid delta and absolute pyramids. One convenient property of a delta value is that it can be averaged with another images' delta value before being summed with a parent to achieve a very economical blend of two images at that frequency or level. This averaging function can be applied across a few frequencies for a narrow blend, or across many frequencies for a broad blend. This reduces the run-time computational complexity. At database load time, each theme may be read, mipped, and then delta extracted.

Photographic blending is similar to theme blending. Generally, each photo inset is pre-processed from a set of source image files. Source imagery may be re-sampled and mipped into whole-earth sampling grids. Then a delta value can be generated for each texel and associated with that texel. The delta-extended texels may be tiled and the tiles (disk blocks) stored in spatially-organized database files. At run-time, the database files which contain tiles in proximity to the currently displayed view are opened and several tiles are paged into memory for each mipmap level.

Figure 3A:
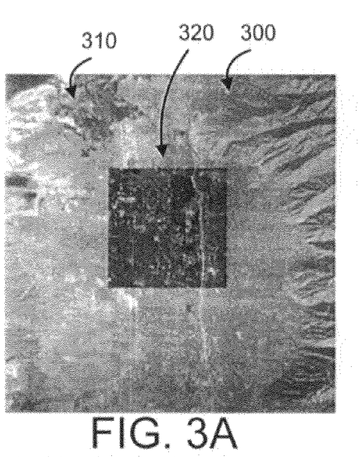
FIGS. 3A-3F are representations of a digital image continuous texture environment including a first digital image having a high resolution nested within a second digital image having a lower resolution at a variety of different blend width gradations, according to an exemplary embodiment.
Figure 3B:
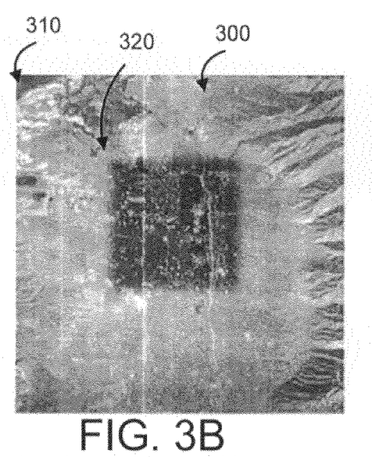
Figure 3C:
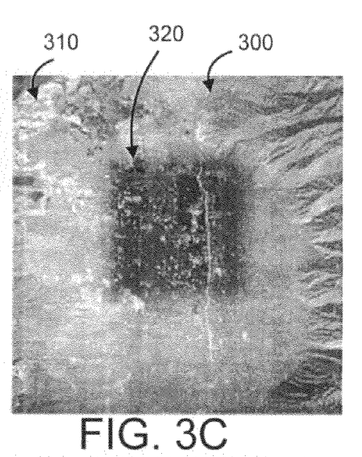
Figure 3D:
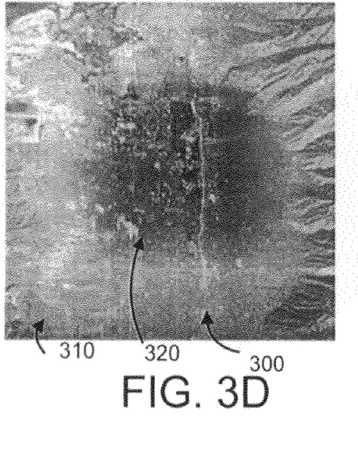
Figure 3E:
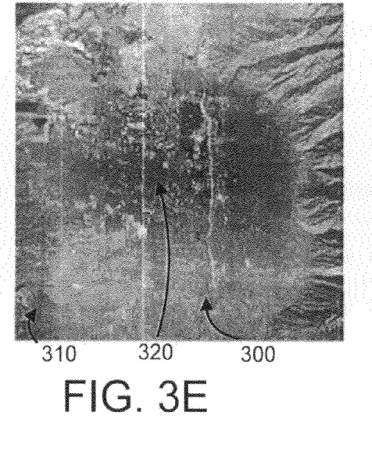
Figure 3F:
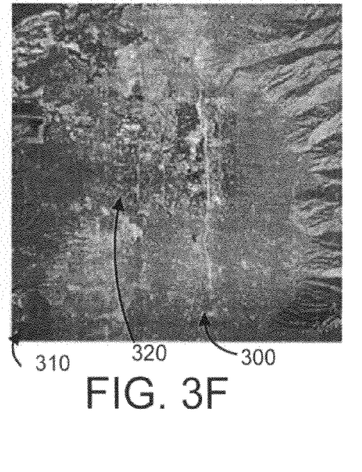

Since a photo inset is typically dissimilar from whatever type of texture image surrounds it, it is often desirable to blend along the inset's perimeter. Similar to texture images, difference pyramids may be employed to achieve a blend. A photo patch may be blended by referring to the delta portion of the extended texel. For perimeter samples, the delta value may be averaged with the corresponding delta value of the underlying layer (whether a texture image or other photographic image). After the delta value has been conditionally averaged, it is summed with its parents' average and written to the delta value dataset 212. The blend gradient can be varied by adjusting the mipmap level at which blending begins. Referring now to FIGS. 3A-3F, a digital image continuous texture environment 300 is shown, including a first digital image 310 having a high resolution nested within a second digital image 320 having a lower resolution at a variety of different blend width gradations, according to an exemplary embodiment. FIG. 3E illustrates environment 300 having a first level of blending, FIG. 3B illustrates environment 300 having a second level of blending, FIG. 3C illustrates environment 300 having a third level of blending, FIG. 3D illustrates environment 300 having a fourth level of blending, FIG. 3E illustrates environment 300 having a fifth level of blending, FIG. 3F illustrates environment 300 having a sixth level of blending.

Although it is possible to generate delta values at the time the image is displayed, the computational burden is significantly reduced if the delta values are pre-computed and stored in the database 210. Database 210 is therefore comprised primarily of delta values rather than absolute values. Datasets 212 and 214 may be database sections of land classification database 120 and photographic imagery 130. Each of databases 120 and 130 may include one or more of data sets 212 and 214.

Although a broad blend is usually desired, as shown in FIG. 3F, there may be cases where the blend region encroaches too far towards the interior of the inset, modifying the source imagery in places or ways detrimental to the training. In some cases, no blending at all may be preferred, as shown in FIG. 3A. It is possible to reconstruct an original absolute sample by summing a child delta sample with an averaged parent sample from the inset's page blocks rather than summing with the blend buffer parent. This effectively undoes the work done at build time to create the delta samples, but at the cost of added run-time computation. Reconstructing the absolute values from the delta values also adds to the complexity of the implementation since parent page blocks need to be locked in memory for the duration of a child patch's processing. Accordingly, storing both absolute and delta values in database 130 is valuable.

For simplicity, flexibility, and improved run-time performance, processor 200 may utilize the absolute values stored in absolute value dataset 214, configured to store the absolute samples to allow processor 200 to reference both delta values and absolute values at run-time.

Datasets 212 and 214 may have the effect of incurring a significant cost in storage and build time, essentially doubling what is already considered to be both bulky and slow. According to an exemplary embodiment, this cost may be reduced by eliminating the absolute samples from some of the higher-resolution mip levels and only storing both absolute and delta values in coarser mip levels. Since a large percentage of the total volume of a terrain texture database is in its first few (high-res) levels, augmenting the remaining levels incurs only a minor incremental cost. For situations where blending is not preferred, we can thus directly load the original absolute samples for all of the absolute/delta hybrid levels.

Although shown and described above with reference to photographic image blending, it should be understood that the above described functionality is applicable to other types of grid-sampled data such as elevation grids, which can also suffer from discontinuity artifacts. Further, although an example is provided of one implementation of storage of certain levels of absolute values based on the level of mipmap resolution, it should be understood that absolute value dataset 214 may be configured to store absolute values for any number of mipmap levels.

Figure 4:
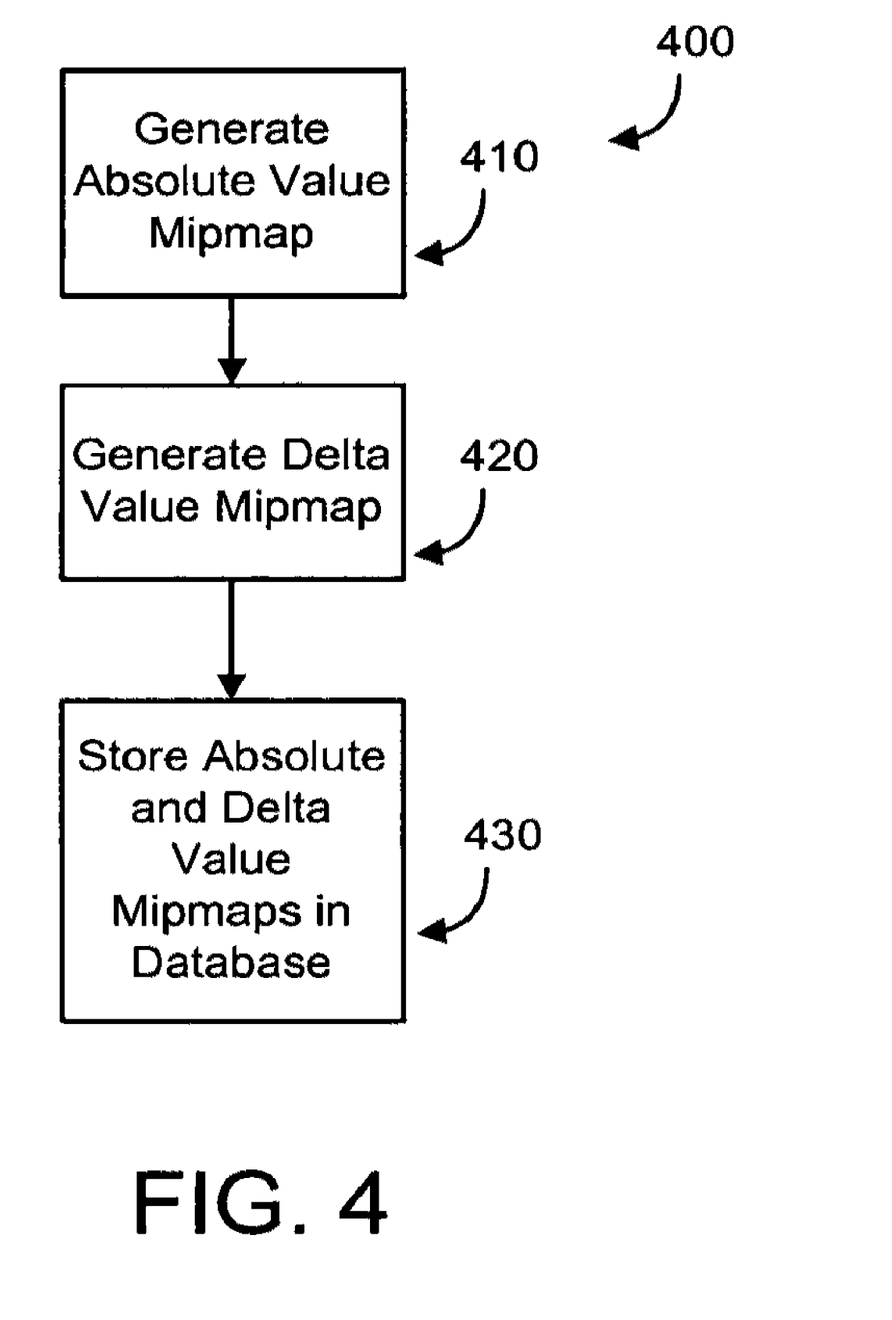
FIG. 4 is a flowchart illustrating a method for preparing an image database for a continuous texture environment, according to an exemplary embodiment.

Referring now to FIG. 4, a flowchart 400 illustrating a method for preparing an image database for a continuous texture environment is shown, according to an exemplary embodiment. The method of flowchart 400 may be implemented during an initialization phase prior to utilization of system 100 for displaying imagery including the inset.

In a step 410, an absolute value mipmap for the image dataset may be created using standard techniques. An example of the standard techniques is described above with reference to FIG. 1.

In a step 420, the absolute value mipmap is used to create a delta value mipmap by subtracting each sample from its parent value in the next coarser mipmap level as also discussed above with reference to FIG. 1. Accordingly, where the absolute value mipmap from step 410 includes n levels of detail, the delta value mipmap will correspondingly have n levels.

In a step 430, system 100 is configured to allow a user to store both the delta value mipmap and the absolute value mipmap back into database 210. The degree to which blending will be allowed is determinative for the number of levels of the absolute value mipmap that are stored and may be determined base on a user selectable value entered into system 100. The greatest flexibility may be obtained by storing complete pyramids for both the delta value and absolute value mipmaps.

Figure 5:
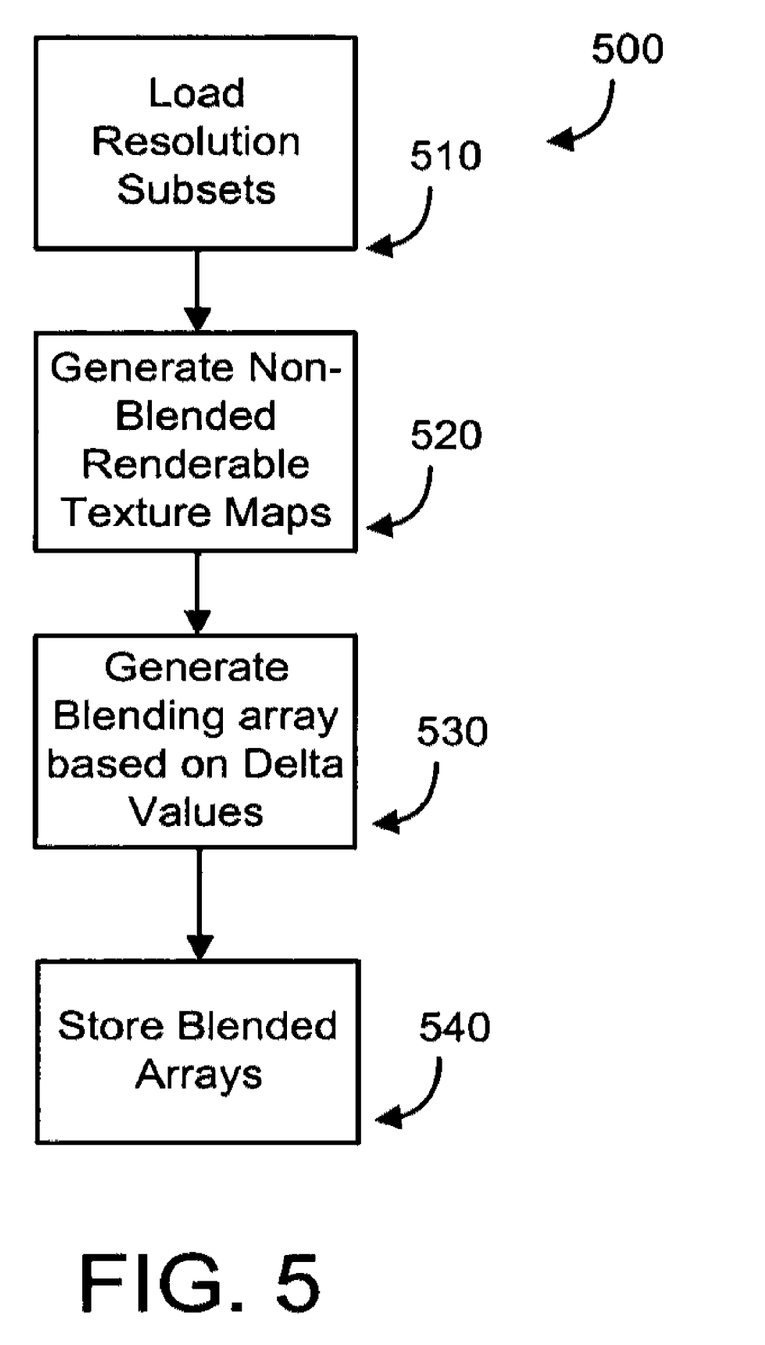
FIG. 5 is a flowchart illustrating a method runtime method for accessing, processing and displaying imagery from the image database for a continuous texture environment, according to an exemplary embodiment.

Referring now to FIG. 5, a flowchart 500 illustrating a method runtime method for accessing, processing and displaying imagery from the image database for a continuous texture environment is shown, according to an exemplary embodiment. The method of flowchart 500 may be implemented during an utilization phase of system 100 for displaying imagery including inset imagery.

In a step 510, a subset of each resolution of the image database is loaded into memory. For those levels which are not to be blended, the absolute values are loaded in a step 520. For levels to be blended, the delta values are loaded in a step 530. Accordingly, system 100 is configured to make a runtime determination of the values that are to be loaded. The runtime determination may be made, for example, based on a user controlled parameter. The parameter may determine the blending that occurs for each level. System 100 may be configurable such that a user can select the level of image blending to be implemented by processor 200. A user may desire a high level of image blending, for example, where the smoothness and natural appearance of the continuous texture environment is the primary concern. However, a user may select a low level of image blending where the accuracy of the images displayed is the primary concern.

In a step 520, for all levels which are not to be blended, the corresponding renderable texture maps are created. For the highest resolution non-blended level, the image samples into a multi-level blending array may also be copied.

In a step 530, for all levels which are to be blended, and working from the coarsest level towards the highest resolution level, the delta samples of the current level are blended with the absolute samples in the next coarser level which have been stored in the blending array. Each delta sample is summed with a weighted average of the corresponding absolute parent samples at the next coarser resolution. The resulting sum of a delta sample with absolute parent values is a blended absolute sample.

Further, the samples which are on or near the perimeter of the image are alpha-blended before being summed with the parent samples. The degree to which the perimeter of an image is blended may also be a user selectable parameter, e.g., the user may select the number of perimeter pixels to be alpha blended.

In a step 540, the newly obtained blended absolute samples are stored into the blending array. As individual blended absolute samples become available, or as collections of neighboring samples become available, the samples are loaded into the appropriate renderable texture mipmap level.

Accordingly, system 100 is configured to receive a blending level indication. The blending level may be user-selectable, such that the user can manually provide the level of blending that they wish to view. The level of blending may include an indication of both the amount of blending and the depth of blending. The amount of blending may indicate whether abutting pixels should be averaged, modified toward a mean of the absolute value and the average, etc. The depth level of the blending may be a number of pixels over which the blending will occur (i.e., defining a blend region). The blend region may be broadened by defining a border region around the perimeter of an inset photographic image inset which is several texels wide at each mipmap level. Within this region, user-selectable blending depth may be implemented by alpha-blending the values as a function of distance from the edge of the photographic inset. If the inset were known to be geometrically simple, (e.g., rectangular), then it would be relative simple to determine the distance from edge at run time. However, since insets may have arbitrarily complex boundaries, the distance may be pre-computed and stored with the image data.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of renderer, number of mipmap levels, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A system for generating and displaying a continuous texture environment based on mipmapped texture and photographic images, each mipmapped image having a plurality of mipmap level representations of a particular texture or photographic image, the system comprising:

a delta value dataset configured to store a plurality of delta values for the texture images and photographic images, each delta value representing the difference between a child pixel in a first mipmap level and a parent sampling from a second mipmap level, wherein the first mipmap level is associated with a different coarseness than the second mipmap level;

an absolute value dataset configured to store a plurality of absolute values for the photographic images to be displayed in the continuous texture environment; and an environment processor configured to generate the continuous texture environment including the texture images and the photographic images derived from the delta value dataset and the photographic images from the absolute value dataset; the environment processor including a blending processor configured to blend the photographic imagery and texture images to remove discontinuities using the delta values, wherein the plurality of delta values are determined and stored in the delta value dataset and the plurality of absolute values are determined and stored in the absolute value dataset prior to a runtime of the environment processor in which the environment processor is configured to generate the continuous texture environment, wherein the delta value dataset is configured to store delta values relating to each of the plurality of mipmap levels prior to the runtime of the environment processor, and wherein the absolute value dataset is configured to store absolute values for a subset of the mipmap levels and to exclude from storage absolute values for at least one higher-resolution mipmap level.

2. The system of claim 1, wherein a level of blending implemented by the blending processor is user-selectable.

3. The system of claim 2, wherein the level of blending is implemented by adjusting the highest mipmap level at which blending is implemented.

4. The system of claim 1, wherein, at the highest resolution, the blending processor is configured to use delta values to obtain a multi-frequency blend along a perimeter of a photographic image inset.

5. The system of claim 4, wherein the level of blending is configurable including at least one of utilizing a zero level of blending and defining a region over which blending occurs.

6. The system of claim 1, wherein the number of pixels over which blending occurs is user selectable, further wherein an alpha is applied as a function of the distance from the closest edge of a photographic image.

7. A system for generating and displaying a grid sampled dataset based on a mipmapped representation having a plurality of mipmap levels, the system comprising:

a delta value dataset configured to store a plurality of delta values for the dataset, each delta value representing the difference between a child sample in a first mipmap level and a parent sampling from a second mipmap level, the first mipmap level having a different level of detail than the second mipmap level;

an absolute value dataset configured to store a plurality of absolute values for the dataset to be displayed in the grid sampled environment; and an environment processor configured to generate the grid sampled environment including the delta values and the absolute values, the environment processor including a blending processor configured to blend the environment representation dataset to remove discontinuities using the delta values, wherein the plurality of delta values are determined and stored in the delta value dataset and the plurality of absolute values are determined and stored in the absolute value dataset prior to a runtime of the environment processor in which the environment processor is configured to generate the grid sampled environment, wherein the delta value dataset is configured to store delta values relating to each of the plurality of mipmap levels prior to the runtime of the environment processor, and wherein the absolute value dataset is configured to store absolute values for a subset of the mipmap levels and to exclude from storage absolute values for at least one higher-resolution mipmap level.

8. The system of claim 7, wherein a level of blending implemented by the blending processor is user-selectable.

9. The system of claim 8, wherein the level of blending is implemented by adjusting the coarsest mipmap level at which blending is implemented.

10. The system of claim 7, wherein, the blending processor is configured to utilize delta values from the delta value database to generate a blend border around a data inset, wherein the blend border is several levels wide at each mipmap level.

11. The system of claim 10, wherein the level of blending is configurable.

12. The system of claim 7, wherein the number of pixels over which blending occurs is user selectable, further wherein an alpha is applied as a function of the distance from the closest edge of a data inset.

13. A method for generating and displaying a continuous texture environment based on a user-selectable blending level, the method comprising:

generating an absolute value dataset configured to store a plurality of absolute values for the dataset to be displayed in the grid sampled environment;

generating a delta value dataset configured to store a plurality of delta values for the dataset, each delta value representing the difference between a child pixel in a first mipmap level of a plurality of mipmap levels and a parent sampling from a second mipmap level of the plurality of mipmap levels, the first midmap level having a different level of detail from the second mipmap level; and generating, using an environment processor, the grid sampled environment including the delta values and the absolute values, including blending the environment representation dataset to remove discontinuities using the delta values, wherein the delta value dataset and absolute value dataset are generated prior to a runtime of the environment processor in which the grid sampled environment is generated, wherein the delta value dataset is configured to store delta values relating to each of the plurality of mipmap levels prior to the runtime of the environment processor, and wherein the absolute value dataset is configured to store absolute values for a subset of the mipmap levels and to exclude from storage absolute values for at least one higher-resolution mipmap level.

14. The method of claim 13, wherein a level of blending implemented by the blending processor is user-selectable.

15. The method of claim 14, wherein the level of blending is implemented by adjusting the coarsest mipmap level at which blending is implemented.

16. The method of claim 13, further including utilizing displaying delta values from the delta value database to generate a border around a data inset.

17. The method of claim 16, wherein the level of blending is configurable.

* * * * *